United States Patent [19]
Rohland

[11] 3,998,561
[45] Dec. 21, 1976

[54] FRICTION GROMMET

[75] Inventor: Bernhard Rohland, Molndal, Sweden

[73] Assignee: Gerro Holding Company Limited, Vaduz, Liechtenstein

[22] Filed: Jan. 9, 1976

[21] Appl. No.: 647,777

[30] Foreign Application Priority Data
Jan. 9, 1975  Sweden .......................... 7500203

[52] U.S. Cl. .......................... 403/210; 403/348; 24/115 K
[51] Int. Cl.² .......................... F16G 11/14
[58] Field of Search .................. 403/210, 349, 348; 24/115 J, 115 K, 132 R

[56] References Cited
UNITED STATES PATENTS

| | | | |
|---|---|---|---|
| 2,602,206 | 7/1952 | Rishel | 24/115 J |
| 3,867,046 | 2/1975 | Fox | 403/210 |

*Primary Examiner*—Andrew V. Kundrat

[57] ABSTRACT

A friction grommet for securing and retaining the end portion of a rope, comprising a bottom piece and a locking lid piece adapted to be secured together. The bottom piece comprises an upright and a pin extending from one side thereof, the upright having an axial aperture and beams projecting radially into the aperture to define groove therebetween. The locking lid piece comprises an upright extending from one side thereof and having radially projecting locking beams adapted to fit into the grooves of the bottom piece upright and to engage the beams of the bottom piece upright when the bottom piece and locking lid piece are secured together by inserting the locking lid piece upright within the bottom piece upright and turning one piece relative to the other. The bottom piece and locking lid piece are provided with cooperating locking means which serve to prevent relative rotation thereof when they are secured together in predetermined relation.

8 Claims, 6 Drawing Figures

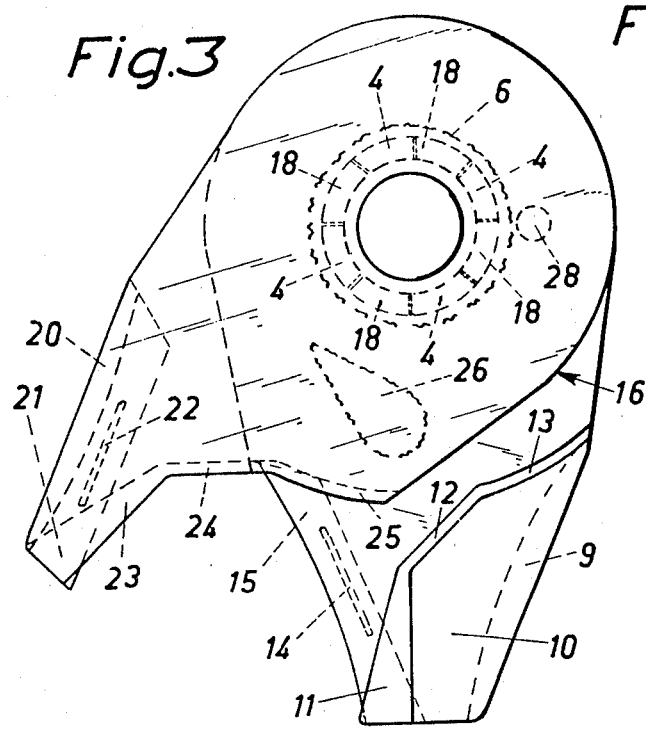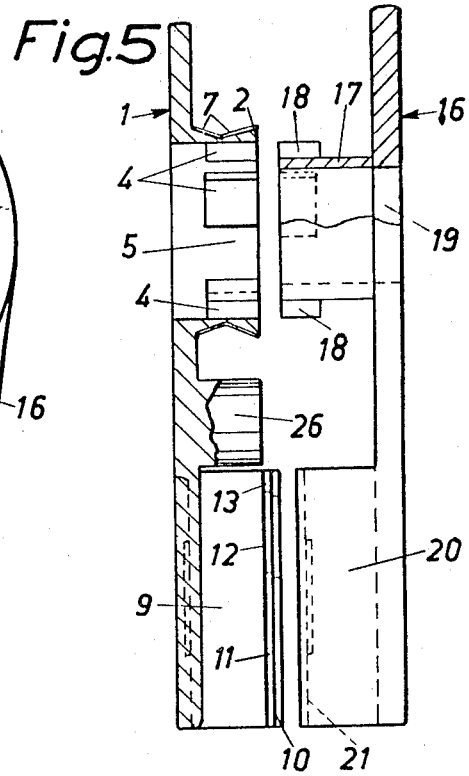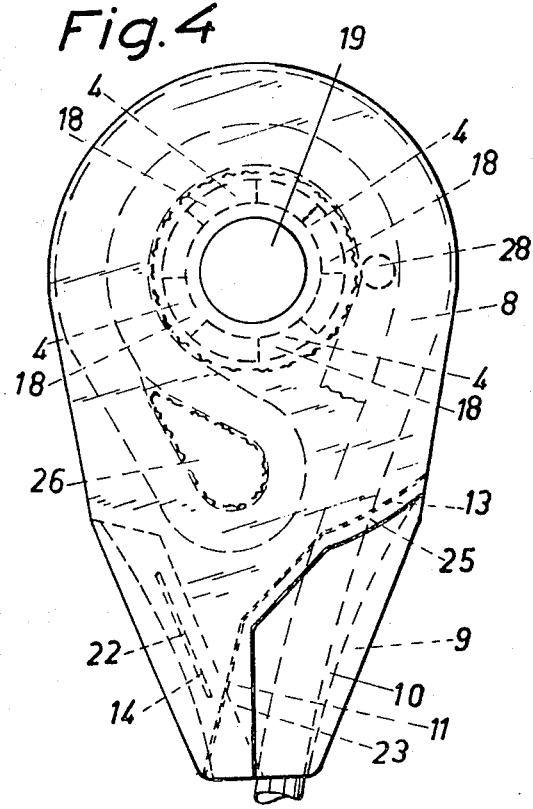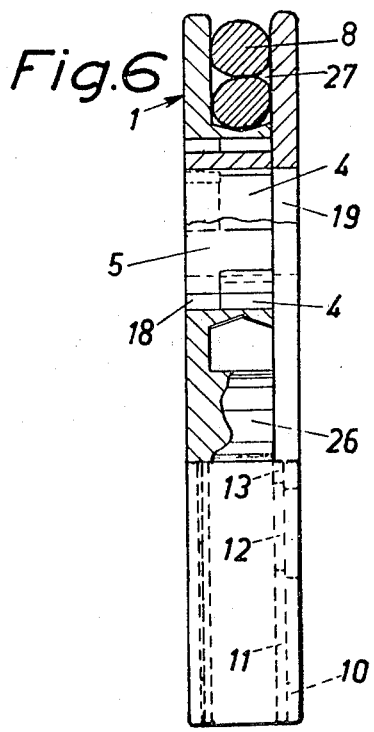

FRICTION GROMMET

BACKGROUND AND SUMMARY OF THE INVENTION

The present invention concerns a friction grommet for securing and retaining the end portion of a rope, comprising a bottom piece and locking lid piece. More precisely, the invention pertains to a friction grommet of this kind wherein the bottom piece is provided with an upright and at the same time with a pin projecting in the same direction from the bottom piece. In use, the end portion of a rope is arranged in the form of a loop around the upright, then in the opposite direction around the pin then again back around the upright to the above mentioned loop and finally out of the grommet.

With a grommet of this kind it is possible to achieve a lock for the ends of a rope in a simple manner. Therefore, there is no need to perform the cumbersome task of splicing the rope by hand. Instead, in one simple move, the end of the rope only have to be placed into the grommet. The latter can be provided with an eyelet or similar device by means of which the grommet can be fastened to a shackle or by other suitable means. When the rope is put under stress, the end part, which had been placed inside the grommet is firmly held by the force of its friction.

Prior-art versions of friction grommets are known but are, however, unsatisfactory. In accordance with one known arrangement, the locking lid piece is secured to the bottom piece by means of screws, whereby a closed chamber is formed enclosing the end portion of the rope. This means that, although the rope may be rapidly put in position inside the grommet, considerable time and special tools are still needed to lock the two parts together. A lid designed in such a manner that it need only be pressed onto the bottom piece is also not satisfactory, since in such a case there would always be a risk of inadvertently tearing off the lock-part whenever the pull on the rope is biased, resulting in loss of the frictional connection of the rope inside the grommet.

The purpose and novelty of the present invention is the creation of a friction grommet which can be closed in a simple manner and without the help of any kind of tools and which at the same time presents an absolutely reliable arrangement for safely and permanently securing the ends of a rope. According to the invention, this purpose is achieved in a manner which is described hereinafter.

BRIEF DESCRIPTION OF THE DRAWINGS

A more detailed explanation can also be seen on the accompanying drawings wherein:

FIGS. 3 and 4 views of the bottom and locking pieces in various stages of assembly; and FIGS. 5 and 6 are partly broken side views of the two parts in a face-to-face position as well as the two parts assembled together.

DESCRIPTION OF THE PREFERRED EMBODIMENTS

Figure 1:
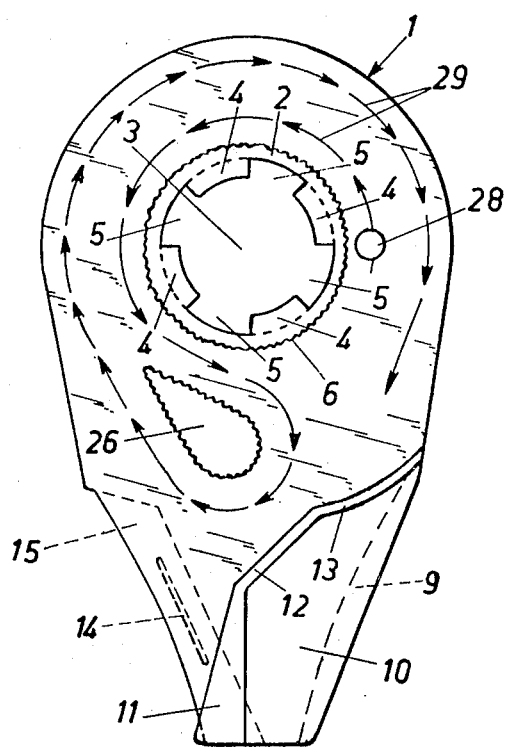
FIG. 1 is a plan view of the bottom piece of the friction grommet.

In accordance with the present invention, the friction grommet comprises two half sections, one of which is shown separately in FIG. 1 and which in the following will be called the bottom piece 1. The bottom piece 1 is proved with an upright 2 (see also FIG. 5), equipped with an axial opening 3, which in accordance with the illustrated embodiment extends through the bottom piece 1. The upright is provided with beams 4 projecting radially into the opening 3 whereby groove 5 are formed in between the beams. On its external face, the upright 2 is provided with serrations 6 extending in an axial direction. In addition, the external face is formed like a groove, the walls 7 which diverge outwardly. At the rope exit area, i.e., the portion of the bottom piece 1 where a rope 8 arranged about the upright 2 is to leave the bottom piece (see FIG. 4), the latter is provided with an edge wall 9 from which extends over the bottom piece an overhanging portion 10 having bevelled edges 11, 12 and 13. At the opposite side, the bottom piece is provided with an elongated slit 14 in a recessed area 15.

Figure 2:
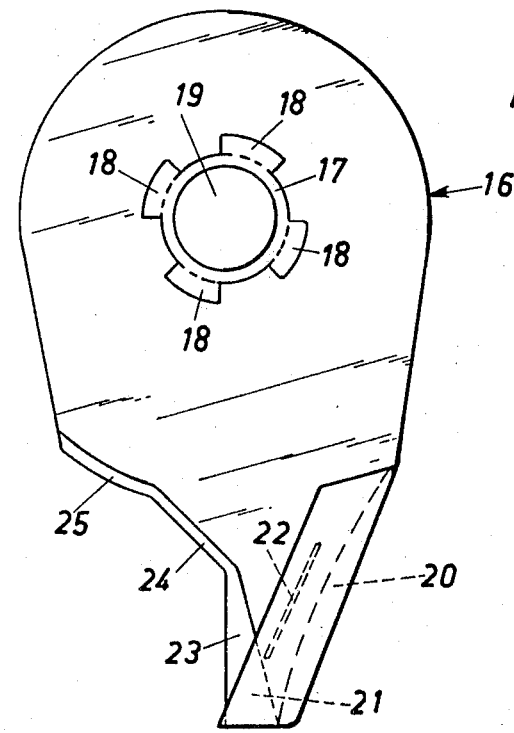
FIG. 2 is a plan view of the locking lid piece of the friction grommet.

The other half section of the grommet is shown separately in FIG. 2 and comprises the locking lid piece 16. It is likewise provided with an upright 17, formed with radially projecting beams 18, fitting into the grooves 5 of the upright 2 of the bottom piece 1 and provided with an axial aperture 19, passing through the locking lid piece. Like the bottom piece 1, the locking lid piece 16 is furthermore provided with an edge wall 20 and with a locking flange 21, projecting inwards from this wall, extending in parallel relation with the plane of the locking lid piece. On its face turned towards the locking lid piece 16, the locking flange 21 is provided with an elongated bead 22, fitting into the slit 14 formed in the bottom piece 1. On its side opposite the locking flange 21, the locking lid piece 16 is provided with bevelled edges 23, 24 and 25 matching the bevelled edges 11, 12 and 13 of the bottom piece 1.

The introduction of a rope 8 in the grommet is carried out in a usual and already known manner, whereby the rope end is arranged in a loop about the upright 2 of the bottom piece 1 first in a counter-clockwise direction as seen in FIG. 1, then in the opposite direction (clockwise) about pin 26, projecting from the bottom piece next to and in the same direction as upright 2. This pin, like upright 2 is serrated in an axial direction to enhance the friction. From there, the rope end is placed to run back about the upright 2 outside the aforementioned loop, beneath the overhanging portion 10 and then leaves the grommet alongside wall 9. When the rope 8 is stretched, the frictional engagement occurring between the rope parts proper, as well as between the rope parts and the upright 2 and the pin 26, will increase to such an extent that any sliding of the rope end portion out of the grommet is absolutely impossible.

The two grommet halves are assembled in the following manner: Upright 17 of the locking lid piece 16 with its actual locking beams 18 is introduced into upright 2 of the bottom piece 1 to fit into grooves 5 in between locking beams 4 of upright 2. When the upright 17 is placed into upright 2, locking lid piece 16 and bottom piece 1 are positioned with respect to each other as shown in FIG. 3. The upright 17 is inserted into the upright 2 sufficiently far for its beams 18 to reach beyond the beams 4 of the upright 2. The gap 27 (see FIG. 6) between the bottom piece 1 and the locking lid piece 16 that still remains after assembly of the two halves is preferably somewhat less than the diameter of the rope 8 for which the grommet is intended.

After assembly of the bottom piece 1 and the locking lid piece 16 in the manner described above, the two pieces are turned relative to one another for interconnection from the position illustrated in FIG. 3 to the position illustrated in FIG. 4. The locking beams 18 are thereby placed into abutment against one end face of the locking beams 4 thus being secured to one another in a bayonet catch fashion. The bevelled edges 23, 24 and 25 of the locking lid piece 16 slide in over the corresponding edges 11, 12 and 13 of the bottom piece 1, and the locking flange 21 of the locking lid piece engages the recessed area 15 of the bottom piece and its bead snaps into the slit 14.

The grommet is thereafter securely closed, with the rope 8 positioned somewhat under compression therein, so that there is no danger that as a result of intermittent pulls the rope might slowly slide out of the grommet or that the latter might open when the pull on the rope is unbalanced or biased.

As long as the two sections 1 and 16 are interconnected, according to FIG. 4, the bayonet catch lock prevents them from coming apart, and the snap locks 14, 21 and 22 prevent any inadvertent dislocation of the sections (that may result in loosening of the sections from one another). The design of the grommet with the overhanging portion 10 and the engaging locking flange 21 also has the important effect of the grommet becoming very strong in the area where the rope exists from the grommet, and it is exposed to stresses and pulls in several directions.

When a load is applied on the rope the latter is extended to a certain significant degree and as a result its diameter decreases. Normally upon heavy stretching of the rope, its outer loop about the upright 2 (see FIG. 6) may press itself next to the inner loop, which could give rise to a detrimental bursting effect. In accordance with the present invention, however, on the one hand the rope parts will be somewhat compressed right from the beginning between the two sections of the grommet, as mentioned above. On the other hand, the external face of the upright 2 is formed like a channel, having outwardly diverging walls. As a consequence, the rope parts are absolutely prevented from placing themselves side by side, even when the rope is under heavy load.

An additional feature in the bottom piece 1 is that an observation aperture 28 is provided adjacent to the upright 2 through which aperture the end of the rope 8 is visible. Thanks to this aperture it is possible after application of the rope inside the grommet and assembly of the latter, to check visually that the rope position inside the grommet is correct and that, consequently, the assembly has been performed in the proper manner.

A further feature of the grommet in accordance with the invention is the provision of arrows 29 on the bottom piece 1 to facilitate the correct way of positioning the rope inside the grommet.

The invention is not limited to the embodiments as shown and described, but various modifications thereof are possible within the scope of the appended claims. For instance, the grommet need not have a through-aperture formed by openings 3 and 19 but instead may be provided with a loop eye or any other means of fastening at one end. In such cases the upright 17 may be an integral pin and the upright 2 instead will have a bottom aperture, whereby the external faces of the grommet become absolutely locked. Also, the distance between the adjacent pin 26 and the edge wall 20 can be kept big enough to allow two rope parts to be placed alongside each other. This makes it possible that the rope end as well extrudes from the friction grommet or that the friction grommet can be applied anywhere on the rope without making it necessary to cut the latter.

What is claimed is:

1. A friction grommet for retaining the end portion of a rope comprising a locking lid piece and a bottom piece, said bottom piece being provided with an upright and an adjacent pin projecting in the same direction from one side thereof, said upright having an axial aperture and locking beams projecting radially into the aperture to define grooves between the beams, said locking lid piece being provided with an upright projecting from one side thereof and having radially projecting locking beams which are shaped to fit into the grooves of said upright of said bottom piece, the locking lid piece and the bottom piece being adapted to be locked to each other by insertion of the locking lid piece upright into the aperture of the bottom piece upright with the locking beams of the locking lid piece upright fitting into the grooves in the bottom piece upright between the locking beams of the latter, whereby upon the turning of one of said pieces relative to the other the locking beams of the upright of the locking lid piece are placed into abutment against the adjacent faces of the locking beams of the upright of the bottom piece, said locking lid piece and said bottom piece being further provided with cooperating locking means adapted to interlock upon said relative turning of said bottom and locking lid pieces to prevent any inadvertent dislocation of said bottom and locking lid pieces relative to each other.

2. A friction grommet according to claim 1, wherein the locking means of the locking lid piece comprises a flange provided with a bead extending transversely to the direction of movement thereof, and said locking means of the bottom piece comprises a recess adapted to receive said bead therein.

3. A friction grommet according to claim 1, wherein the external face of the upright of the bottom piece is provided with serrations extending in an axial direction.

4. A friction grommet as recited in claim 1, wherein the external face of the bottom piece upright is in the form of a channel, the walls of which diverge outwardly.

5. A friction grommet as recited in claim 1, wherein at the side of the bottom piece upright the bottom piece is provided with an aperture positioned so as to permit the end of a rope to be visible through said aperture.

6. A friction grommet as recited in claim 1, wherein the pin of the bottom piece is serrated in the axial direction.

7. A friction grommet as recited in claim 1, wherein the bottom piece is provided with means thereon to indicate the manner of proper introduction of a rope thereon.

8. A friction grommet as recited in claim 7 wherein said indicating means are arrow marks.

* * * * *